June 27, 1933.  R. G. MOORE ET AL  1,916,113
SHEET METAL HANDLE FOR HOOD CATCHES OR THE LIKE
Filed Feb. 15, 1933   2 Sheets-Sheet 1
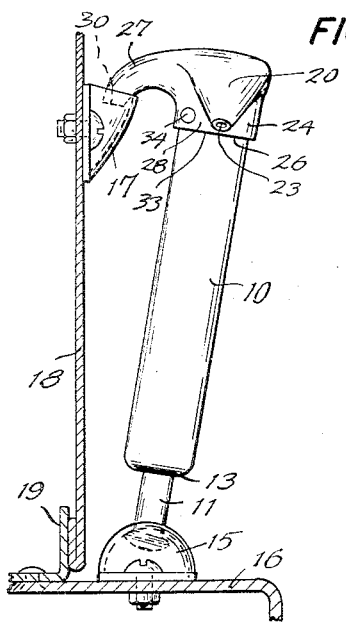
FIG. 1.
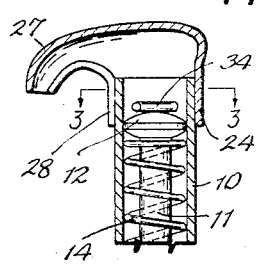
FIG. 2.
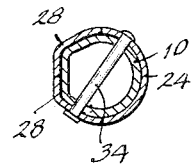
FIG. 3.
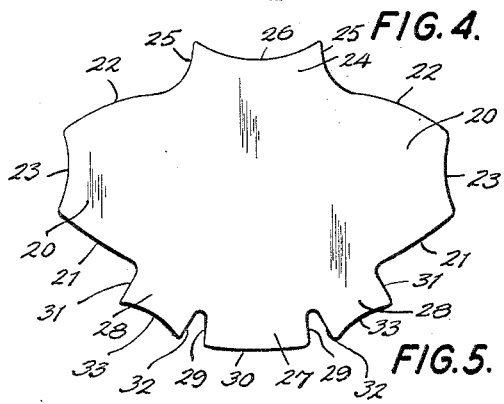
FIG. 4.
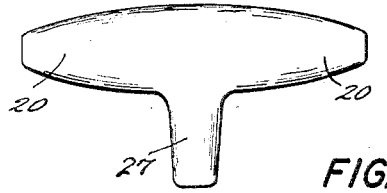
FIG. 5.
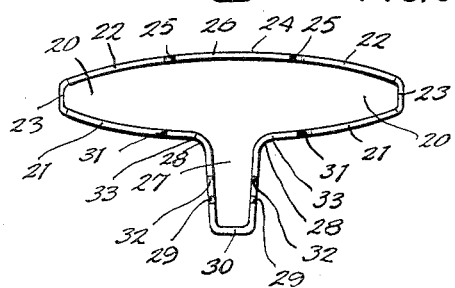
FIG. 6.
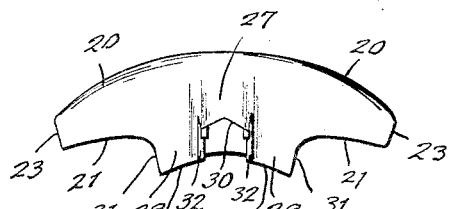
FIG. 7.
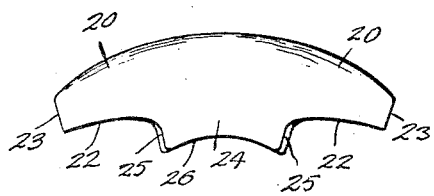
FIG. 8.
FIG. 9.
Inventors
RAYMOND G. MOORE and
ARTHUR CLAUD-MANTLE
By
Attorney June 27, 1933. R. G. MOORE ET AL 1,916,113
SHEET METAL HANDLE FOR HOOD CATCHES OR THE LIKE
Filed Feb. 15, 1933 2 Sheets-Sheet 2
FIG. 10.
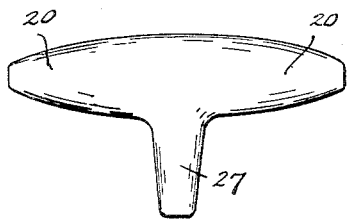
FIG. 15.
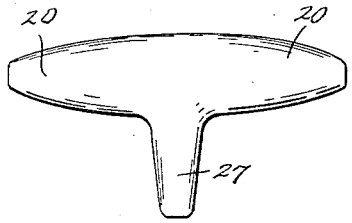
FIG. 11.
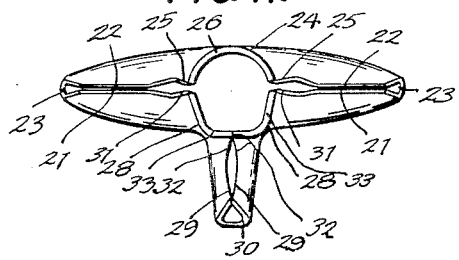
FIG. 16.
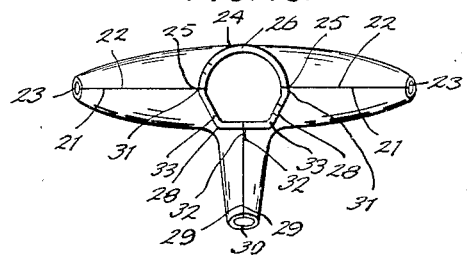
FIG. 12.
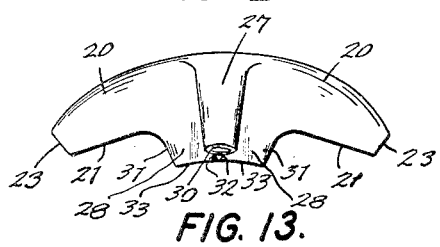
FIG. 17.
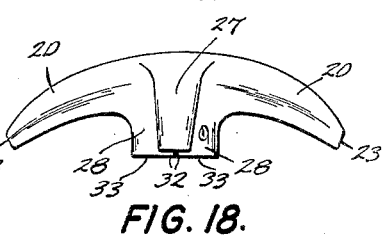
FIG. 13.
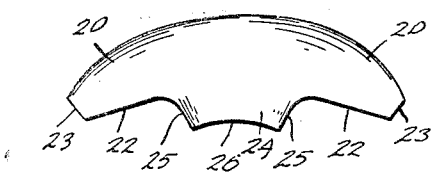
FIG. 18.
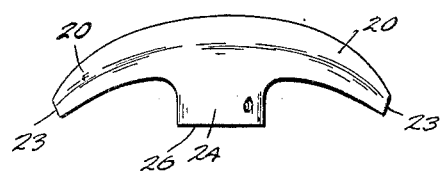
FIG. 14.
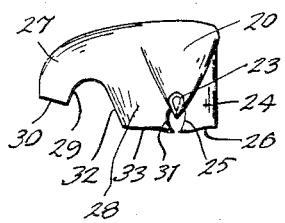
FIG. 19.
Inventors
RAYMOND G. MOORE AND
ARTHUR CLAUD-MANTLE
By
Attorney Patented June 27, 1933

1,916,113

UNITED STATES PATENT OFFICE

RAYMOND G. MOORE, OF BRIDGEPORT, AND ARTHUR CLAUD-MANTLE, OF TRUMBULL, CONNECTICUT, ASSIGNORS TO THE BASSICK COMPANY, OF BRIDGEPORT, CONNECTICUT, A CORPORATION OF CONNECTICUT

SHEET METAL HANDLE FOR HOOD CATCHES OR THE LIKE

Application filed February 15, 1933. Serial No. 656,896.

The present invention relates to an improved sheet metal handle for hood catches or the like, and to the method of producing the same, and has for an object to provide a handle having both a hooking portion and a handle portion disposed at an angle to the hooking portion, and which may be formed from sheet metal in such a manner as to produce a handle structure having relatively great strength, and in which the seams will be entirely concealed at the under side and preferably along concave surfaces, the upper and exposed surfaces presenting a smooth continuous surface. Another object is to provide a handle structure in which the curvature of the handle and hook portions and the arrangement of the seams renders the structure inherently rigid. A further object is to provide a handle structure which may be produced from a flat sheet metal blank by a series of simple forming operations and with relatively simple tools.

With the above and other objects in view an embodiment of the invention is shown in the accompanying drawings, and this embodiment will be hereinafter more fully described with reference thereto, and the invention will be finally pointed out in the claims.

In the drawings:

Fig. 1 is a side elevation of a hood catch, provided with a handle according to the invention.

Fig. 2 is a vertical sectional view of the upper end of the catch, showing the handle and the contiguous end of the catch barrel.

Fig. 3 is a transverse sectional view, taken along the line 3—3 of Fig. 1.

Fig. 4 is a plan view of the sheet metal blank employed.

Figs. 5 to 9 show the blank after the first forming operation, Fig. 5 being a top plan view, Fig. 6 a bottom plan view, Fig. 7 a front view, Fig. 8 a rear view, and Fig. 9 a side view.

Figs. 10 to 14 show the blank after the second forming operation, Fig. 10 being a top plan view, Fig. 11 a bottom plan view, Fig. 12 a front view, Fig. 13 a rear view, and Fig. 14 a side view.

Figs. 15 to 19 show the completed handle after the third forming operation, Fig. 15 being a top plan view, Fig. 16 a bottom plan view, Fig. 17 a front view, Fig. 18 a rear view, and Fig. 19 a side view.

Similar reference characters indicate corresponding parts throughout the several figures of the drawings.

Referring to the drawings, the hood catch shown therein, which is provided with a handle and hook element according to the present invention, is of conventional type, and comprises a tubular barrel 10, having a spring pressed plunger rod 11 slidably mounted therein, this rod having a head 12 at its upper end between which and the flanged base 13 of the barrel a helical spring 14 is disposed about the rod and normally draws the barrel downwardly. The base of the rod is pivotally mounted in a bracket 15 secured to the sill 16. The hood 17 is provided with a keeper 18 adapted to be engaged by the hook of the catch to hold the hood downwardly in closed relation against a base flange 19.

The handle, according to our invention, comprises a pair of downwardly curved finger gripping portions extending at each side of an intermediate socket portion, into which socket portion the hood catch barrel is inserted and secured and a hook portion projecting from the socket portion at a right angle to and intermediate the finger gripping portions.

The flat sheet metal blank from which the handle is formed is shown in Fig. 4, and includes a pair of finger grip forming portions 20—20 having convex front edges 21—21, convex rear edges 22—22, and concave end edges 23—23. A socket forming portion 24, adapted to form the rear half portion of the socket, is projected outwardly intermediate the rear edge portions 22—22, and has concave end edges 25—25 curved into the convex edges 22—22 of the finger grip forming portions 20—20, and a concave edge 26 extending between said end edges 25—25. A hook forming portion 27 and a pair of socket forming portions 28—28 at each side thereof, and adapted to form the forward half portion of the socket, project from the opposite side of the blank from the portion 24, the hook forming portion having substantially straight end edges 29—29 and a slightly convex edge 30 extending between them, and the socket forming portions 28—28 having substantially straight outer end edges 31—31 curved into the edges 21—21 of the finger grip forming portion, substantially straight inner end edges 32—32 curved into the end edges 29—29 of the hook forming portion 26, and slightly concave edges 33—33 extending between said end edges 31 and 32.

In the first forming operation, shown in Figs. 5 to 9, the finger grip and hook portions are given their approximate plan outline and surface contour shapes, the top surface being crowned longitudinally along the finger grip portions and transversely along the hook portion, and the side and bottom forming portions being bent straight downwardly as shown in Figs. 7, 8 and 9. It will be observed that in this forming operation the socket forming portions 28—28 are given an approximate right angle bend, as shown in Fig. 6, with the corners of the angles disposed outwardly.

In the second forming operation, shown in Figs. 10 to 14, the edges 21—21 and 22—22 of the finger grip portions 20—20 are bent toward each other, and the edges 29—29 of the hook portion are also bent toward each other. At the same time the socket forming portions 24 and 28—28 are bent into tubular form, the portion 24 being curved, and the portions 28—28 bent into angular relation opposed to their angular relation in the first forming operation, the corners of the angles being now disposed inwardly as shown in Fig. 11. The edges 25—25 and 31—31 of the portions 24 and 28—28 which are brought toward each other are disposed in inclined relation, as are also the edges 32—32 of the portions 28—28, while the edges 26 and 33—33 are curved concavely.

In the third and final forming operation the edges 22—22 and 21—21 and the edges 29—29 are bent under so that they meet in substantially straight line seams, thus forming the finger grip and hook portions into curved tubular horn-like structures. At the same time the edges 25—25, 31—31 and 32—32 are brought together along substantially vertically disposed straight line seams in continuation of the straight line seams of the finger grip and hook portions. With the drawing in of these edges from the inclined relation of the second forming operation to the vertical relation of the third forming operation the socket forming portions are brought into straight tubular form and the edges 26 and 33—33 are drawn into a flat plane. The socket forming portions 28—28 are of angular form so that the socket shape is non-circular.

The handle is adapted to be secured upon the upper end of the barrel 10, which is given a cross-sectional shape corresponding to that of the socket portion of the handle, as clearly shown in Fig. 3, so that relative turning between the handle and barrel is prevented. A cross pin 34 is engaged diagonally through the socket portion and the barrel, and headed over at its ends, one end being in one of the forward socket forming portions 28 and the other end being diametrically opposed in the portion 26. The socket portion is thus effectually held against the possibility of opening up at the seams through excess strains upon the catch.

The handle according to our invention possesses great inherent strength, is attractive in appearance, and may be very economically formed from flat sheet metal stock.

We have illustrated and described a preferred and satisfactory embodiment of the invention, but it will be obvious that changes may be made therein, within the spirit and scope thereof, as defined in the appended claims.

Having thus described our invention what we claim and desire to secure by Letters Patent is:—

1. A sheet metal handle for hood catches or the like, comprising a finger grip portion having an unbroken top and sides bent downwardly and inwardly, the edges of said sides meeting at the underside to form a seam, and a hook portion integral with said finger grip portion disposed in a plane at right angles to said finger grip portion comprising an unbroken top continuous with the top of said finger grip portion and sides bent downwardly and inwardly, the edges of said sides meeting at the under side to form a seam.

2. A sheet metal handle for hood catches or the like, comprising a finger grip portion having an unbroken top and sides bent downwardly and inwardly, the edges of said sides meeting at the underside to form a seam, and a hook portion integral with said finger grip portion extending in a direction transverse of the direction of said finger grip portion comprising an unbroken top continuous with the top of said finger grip portion and sides bent downwardly and inwardly, the edges of said sides meeting at the under side to form a seam.

3. A sheet metal handle for hood catches or the like, comprising a pair of finger grip portions having unbroken and continuous top surfaces and sides bent downwardly and inwardly, the edges of said sides meeting at the under side to form seams, a hook portion integral with said finger grip portions and projecting transversely at one side medially of said finger grip portions, comprising an unbroken top continuous with the tops of said finger grip portions, and sides bent downwardly and inwardly, the edges of said sides meeting at the under side to form a seam.

4. A sheet metal handle for hood catches or the like, comprising a pair of finger grip portions having unbroken and continuous top surfaces and sides bent downwardly and inwardly, the edges of said sides meeting at the under side to form seams, a hook portion integral with said finger grip portions and projecting transversely at one side medially of said finger grip portions, comprising an unbroken top continuous with the top of said finger grip portions, and sides bent downwardly and inwardly, the edges of said sides meeting at the under side to form a seam, intermediate portions integral with said respective sides and forming a tubular mounting portion between the under sides of said finger grip portions and in transverse alignment with the under side of said hook portion, said seams of said finger grip portions and said hook portion extending to the edge of said tubular mounting portion.

5. A sheet metal handle for hood catches or the like, comprising a pair of finger grip portions having unbroken and continuous top surfaces and sides bent downwardly and inwardly, the edges of said sides meeting at the under side to form seams, a hook portion integral with said finger grip portions and projecting transversely at one side medially of said finger grip portions, comprising an unbroken top continuous with the top of said finger grip portions and sides bent downwardly and inwardly, the edges of said sides meeting at the under side to form a seam, an intermediate portion integral with the rear sides of said finger grip portion, a pair of intermediate portions integral with the respective sides of said hook portion and the forward sides of said finger grip portions, said intermediate portions forming a tubular mounting portion between the under sides of said finger grip portion and in transverse alignment with the under side of said hook portion, said seams of said finger grip portions and said hook portion extending to the edges of said tubular mounting portion.

6. In a hood catch a tubular barrel and a sheet metal handle comprising a pair of finger grip portions having unbroken and continuous top surfaces, and sides bent downwardly and inwardly, the edges of said sides meeting at the under side to form seams, a hook portion integral with said finger grip portions and projecting transversely at one side medially of said finger grip portions, comprising an unbroken top continuous with the top of said finger grip portions and sides bent downwardly and inwardly, the edges of said sides meeting at the under side to form a seam, an intermediate portion integral with the rear sides of said finger grip portions, a pair of intermediate portions integral with the respective sides of said hook portion and the forward sides of said finger grip portions, said intermediate portions forming a tubular mounting portion between the under sides of said finger grip portions and in transverse alignment with the under side of said hook portion, said seams of said finger grip portions and said hook portion extending to the edge of said tubular mounting portion, said tubular mounting portion being engaged on said tubular barrel, and a securing pin extending through said mounting portion and barrel between one of said pair of intermediate portions and a diametrically opposed point of said first mentioned intermediate portion.

Signed at Bridgeport, county of Fairfield, and State of Connecticut, this 2nd day of February, 1933.

RAYMOND G. MOORE.
ARTHUR CLAUD-MANTLE.